United States Patent [19]
Miwa

[11] Patent Number: 5,626,428
[45] Date of Patent: May 6, 1997

[54] KEYBOARD DEVICE

[75] Inventor: Takahiro Miwa, Konan, Japan

[73] Assignee: Brother Kogyo Kabushiki Kaisha, Nagoya, Japan

[21] Appl. No.: 529,335

[22] Filed: Sep. 18, 1995

[30] Foreign Application Priority Data

Nov. 10, 1994 [JP] Japan .................................. 6-276497

[51] Int. Cl.$^6$ ........................................... B41J 5/10
[52] U.S. Cl. ............................................ 400/486; 400/489
[58] Field of Search ........................... 400/486, 489, 400/472

[56] References Cited

U.S. PATENT DOCUMENTS

| | | | |
|---|---|---|---|
| 1,336,122 | 4/1920 | Banaji | 400/486 |
| 2,080,457 | 5/1937 | Bower | 400/486 |
| 3,698,532 | 11/1972 | Dodds | 400/486 |

Primary Examiner—Edgar S. Burr
Assistant Examiner—Anthony H. Nguyen
Attorney, Agent, or Firm—Oliff & Berridge

[57] ABSTRACT

A compact keyboard for use in a portable electronic device includes keys arranged in two level sets. Each set includes an upper level and a lower level, and the keys of the upper and lower levels of each set are arranged in an interdigitated or staggered fashion such the keys of each set form a pattern similar to a pattern of a single row of keys of a standard full-sized keyboard. This key arrangement allows a compact device having limited horizontal dimensions to mimic a key pattern arrangement of a full-sized keyboard. The keys may have pointed indicator portions that bear a character or symbol that indicates the functions of the keys. The pointed indicator portions of the upper and lower levels of a single set may be interdigitated such that characters or symbols on the keys are arranged in a substantially straight line.

20 Claims, 8 Drawing Sheets

KEYBOARD DEVICE

BACKGROUND OF THE INVENTION

1. Field of the Invention

The present invention relates to a keyboard device for use in personal computers, word processors, and the like and, more particularly, to a keyboard device suitable for use in a small, portable device.

2. Description of the Related Art

"Full-sized" keyboards have thus far been the primary keyboard device used with personal computers, word processors, and the like. On this type of keyboard, one switch (or "key") is assigned to one character, and each switch has a key top that is usually provided with a top surface operating portion formed into a square or trapezoidal shape. Usually, the characters or symbols assigned to the switches are marked on the top surfaces of the keys. The conventional ASCII (AMERICAN STANDARD CODE FOR INFORMATION INTERCHANGE) characters may be arranged in one of several standard patterns, and most users are accustomed to at least one of these standard patterns.

With the recent progress in semiconductor technology, devices having excellent processing capability that are small in size and that consume low power have been developed. As a result, notebook-size portable personal computers having word processing, calculation processing, and graphic data processing capabilities equal to a standard sized personal computer are now commonly available. Many of these small devices can be held in one hand while data input operations are performed with the other hand. Therefore, it is preferable that the devices have a shape that is easy to hold with one hand, i.e., a vertically elongated shape like a portable telephone.

Like the devices themselves, the keyboard spaces on such vertically elongated devices tend to also be vertically elongated. Because it is difficult to arrange the keys of a vertically elongated keyboard in one of the familiar standard patterns, the keys are generally arranged in a matrix array wherein the columns are longer than the rows. Generally, the characters are arranged in alphanumeric order, as shown in FIG. 5.

Experienced keyboard operators accustomed to using a keyboard having keys arranged in one of the standard patterns, such as the keyboard shown in FIG. 4, memorize the position of each key on the standard keyboard. Most operators do not even look at the keyboard while entering data. These experienced operators find the alphanumerically arranged keyboard, such as the keyboard shown in FIG. 5, quite difficult to use, because none of the keys are located in the positions they have memorized. As a result, quick key inputting cannot be performed. Having memorized the arrangement of one keyboard, most operators find that it takes a long time to become accustomed to the alphanumerically arranged keyboard.

SUMMARY OF THE INVENTION

The present invention was made to solve the above described problem and it is an object of the invention to provide a keyboard for a small, portable, vertically elongated device that is easy for experienced operators to use. It is another object of the invention to provide a keyboard for a small, portable, oblong device that is easy for experienced operators to use.

In order to achieve these objects, a keyboard device embodying the invention has input keys that are arranged in a plurality of sets, each set comprising two horizontally extending rows of keys arranged one above the other in a staggered fashion. In this arrangement, it is preferable that the keys in each set are arranged such that a horizontal distance between adjoining keys in one row of a set is greater that a horizontal distance between a key in the first row and an adjoining key in the second row of the set. In addition, it is preferable that a vertical distance between keys of different rows of a single set is smaller than a vertical distance between adjacent keys of different sets.

In one embodiment of the invention, the input keys of the keyboard have top surfaces that include pointed portions. The input keys are arranged such that the pointed portions of the first and second rows of each set are arranged in an interdigitated manner. In this embodiment, the pointed portions may bear a character or symbol to indicate the function of the key. In addition, in this embodiment, it is preferable that the keys are arranged so that the characters or symbols on pointed portions of the keys are substantially horizontally aligned.

Because a keyboard embodying the invention has keys that are arranged in sets, with each set comprising two staggered rows of keys, it is possible to decrease the side-to-side dimensions of the keyboard. In addition, because the horizontal distance between adjoining keys at the first and second rows of a set is smaller than the horizontal distance between adjoining keys within a single row, a key arrangement similar to one of the standard full-sized keyboard arrangements can be realized on small, portable, vertically elongated devices.

Moreover, in a keyboard embodying the invention and having keys with pointed portions that are arranged in an interdigitated manner, it is possible to arrange the keys so that the pointed indicator portions of the keys of adjoining rows of a set are arranged in a substantially straight horizontal line. This makes it possible for the user to easily identify the keys of the keyboard, because the pointed indicators portions of the keys of each set closely resemble a single row of keys of a full-sized keyboard.

DESCRIPTION OF PREFERRED EMBODIMENTS

Keyboards embodying the present invention will be described with reference to the accompanying drawings.

Figure 1:
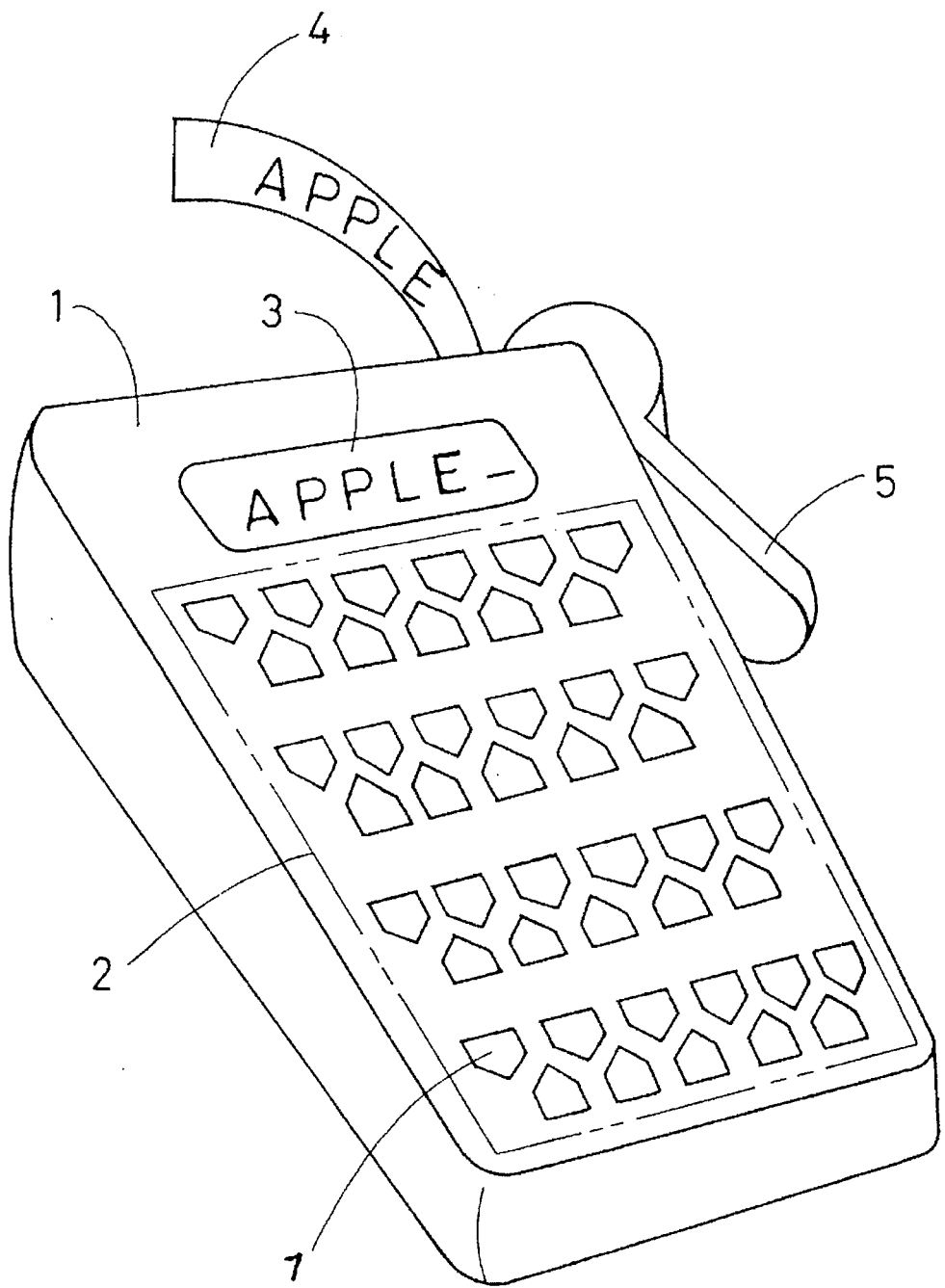
FIG. 1 is a perspective view of a label printer having a keyboard embodying the invention.

The general external structure of a label printer 1 having a keyboard 2 embodying the invention is shown in FIG. 1. The keyboard 2 for inputting characters and symbols is arranged on the top side of the body of the label printer 1 and a liquid crystal display (LCD) 3 for displaying characters and symbols is arranged above the keyboard 2. A character string input on the keyboard 2 may be stored in a memory and/or printed on a label 4 by a printer located within the printer 1. A cutter lever 5 operates a cutter that may be used to cut off a printed label 4 discharged from the body 1. The keys 7 on the keyboard 2 may be any conventional key type, such as membrane switches or contact keys having rubber springs.

Figure 2:
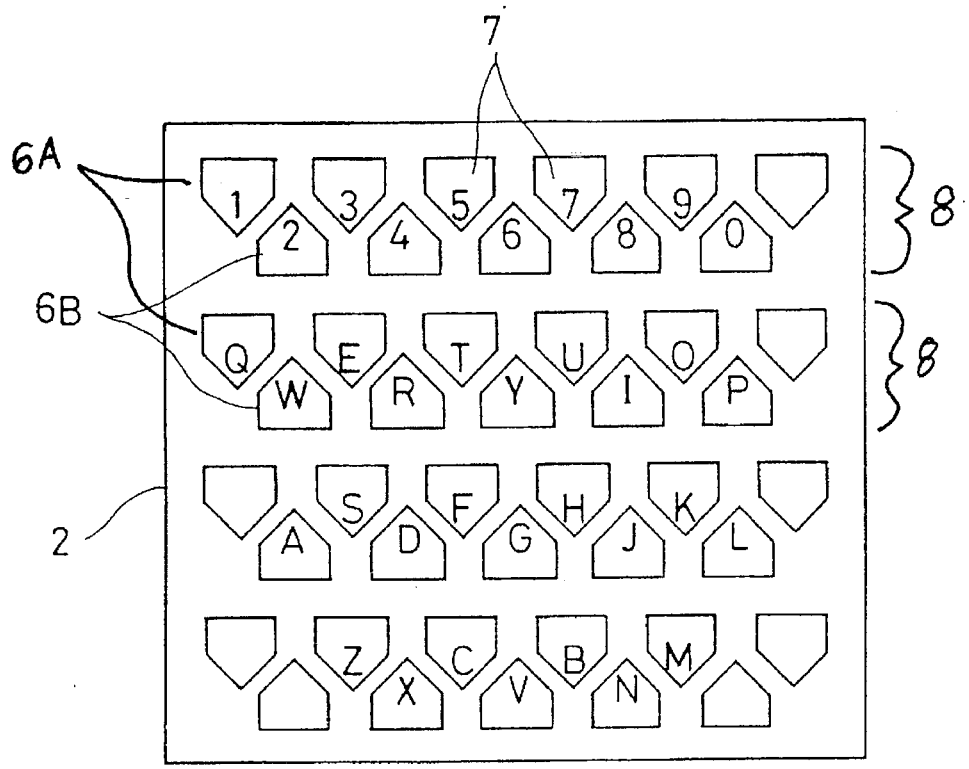
FIG. 2 is a diagram showing a key arrangement of a keyboard embodying the invention.
Figure 3:
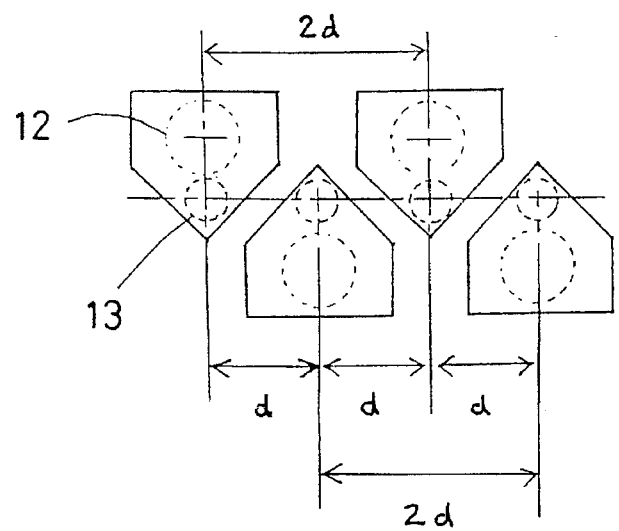
FIG. 3 is a diagram showing the relative spacing between the keys of a keyboard embodying the invention.

The key arrangement of the keyboard 2 shown in FIG. 1 will now be described with reference to FIG. 2 and FIG. 3. FIG. 2 is diagram showing one possible key arrangement of the keyboard 2. FIG. 3 is a diagram showing the relative spacing between adjacent keys of two rows of a set.

The arrangement of the keys 7 shown in FIG. 2 was devised to enable a large number of keys to be arranged in horizontally extending rows. Each key 7 has a pointed portion and is shaped similar to a home plate of a baseball diamond. As shown in FIG. 2, each set 8 of keys 7 comprises an odd-numbered plurality of keys 7 at a first level 6A and an even-numbered plurality of keys at a second level 6B. The pointed portions of the keys 7 of the first and second levels 6A and 6B face one another, and the pointed portions of the keys 7 at the second level 6B are arranged between adjoining pointed portions of the keys 7 at the first level 6A. Thus, the keys in the first and second levels 6A and 6B of each set 8 are combined in such a manner that their pointed portions are interdigitated, and four such sets 8 of keys 7 are arranged on the keyboard 2 shown in FIG. 2.

As shown in FIG. 3, the top surface of each key 7 comprises an operating portion 12 and an indicator portion 13. The operating portion 12 is designed to be pressed by an operator's finger, and the indicator portion 13 is designed to bear a character or symbol. Because the top surface of each key is designed to be pressed by an operator's finger, it is advantageous to make the distance between adjoining keys of each row as large as possible. As shown in FIG. 3, the center-to-center horizontal distance between the operating portions 12 of adjoining keys within each level is 2d. The center-to-center horizontal distance between the operating portions 12 of a key at the first level 6A and an adjoining key at the second level 6B is d. Meanwhile, the indicator portions 13 of the keys in the first and second levels 6A and 6B may be horizontally aligned such that characters or symbols on the indicator portions 13 of the keys are arranged in a pattern similar to a single row of keys of a full-size keyboard.

Figure 6:
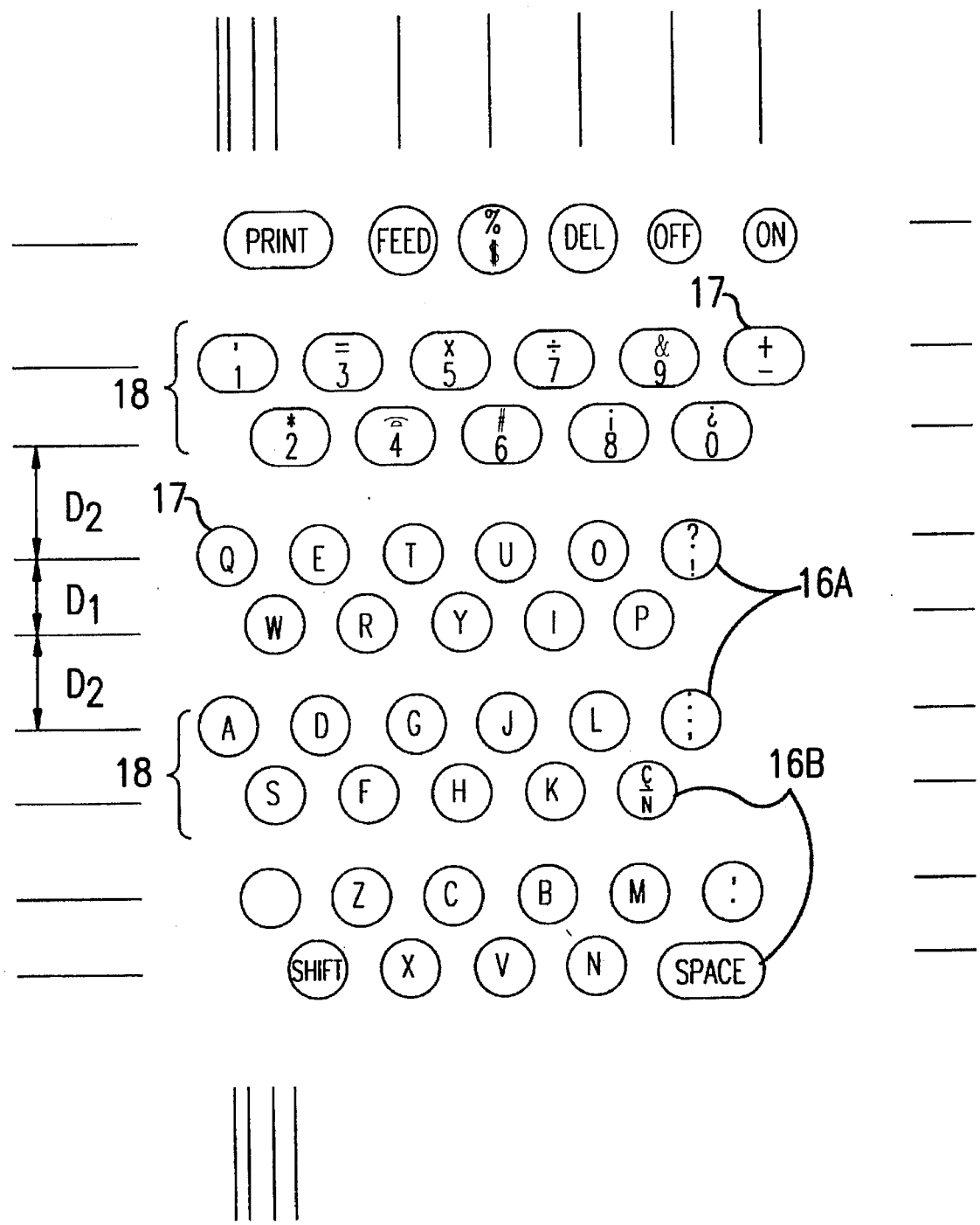
FIG. 6 is a diagram showing the key arrangement of another keyboard embodying the invention.

Referring now to FIG. 6, the key arrangement of a second embodiment of the invention will be described. In the key arrangement shown in FIG. 6, each key 17 has a circular or ovular shaped top surface. The keys 17 are arranged in a plurality of sets 18, such as a set of numeral keys, a first set of letter keys (Q,W,E, . . . ), a second set of letter keys (A,S,D, . . . ), and a third set of letter keys (Shift, Z, X, . . . ). The keys 17 of each set 18 are arranged at a first level 16A and a second level 16B. The keys of the first and second levels 16A and 16B are arranged in a staggered manner. The vertical center-to-center distance D1 between the keys 17 at the first level 16A and the keys 17 at the second level 16B is smaller than the vertical center-to-center distance D2 between the keys 17 at a first level 16A of a first set 18 and the keys 17 at a second level 16B of a second set 18. In this arrangement, the keys 17 of each set 18 are collected into a group, and it is easy for an operator to distinguish between the different sets, and thus to operate the keyboard like a normal full-sized keyboard.

Figure 4:
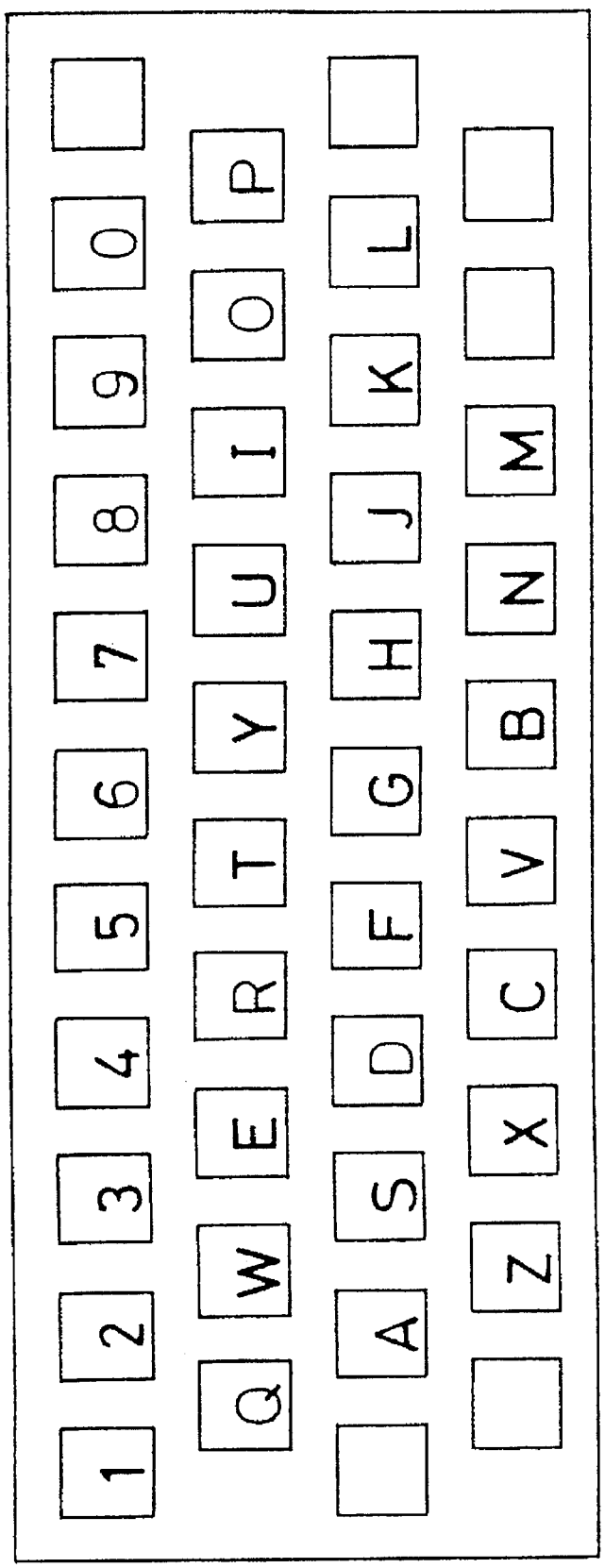
FIG. 4 is a diagram of a typical full-sized keyboard showing one standard key arrangement.
Figure 5:
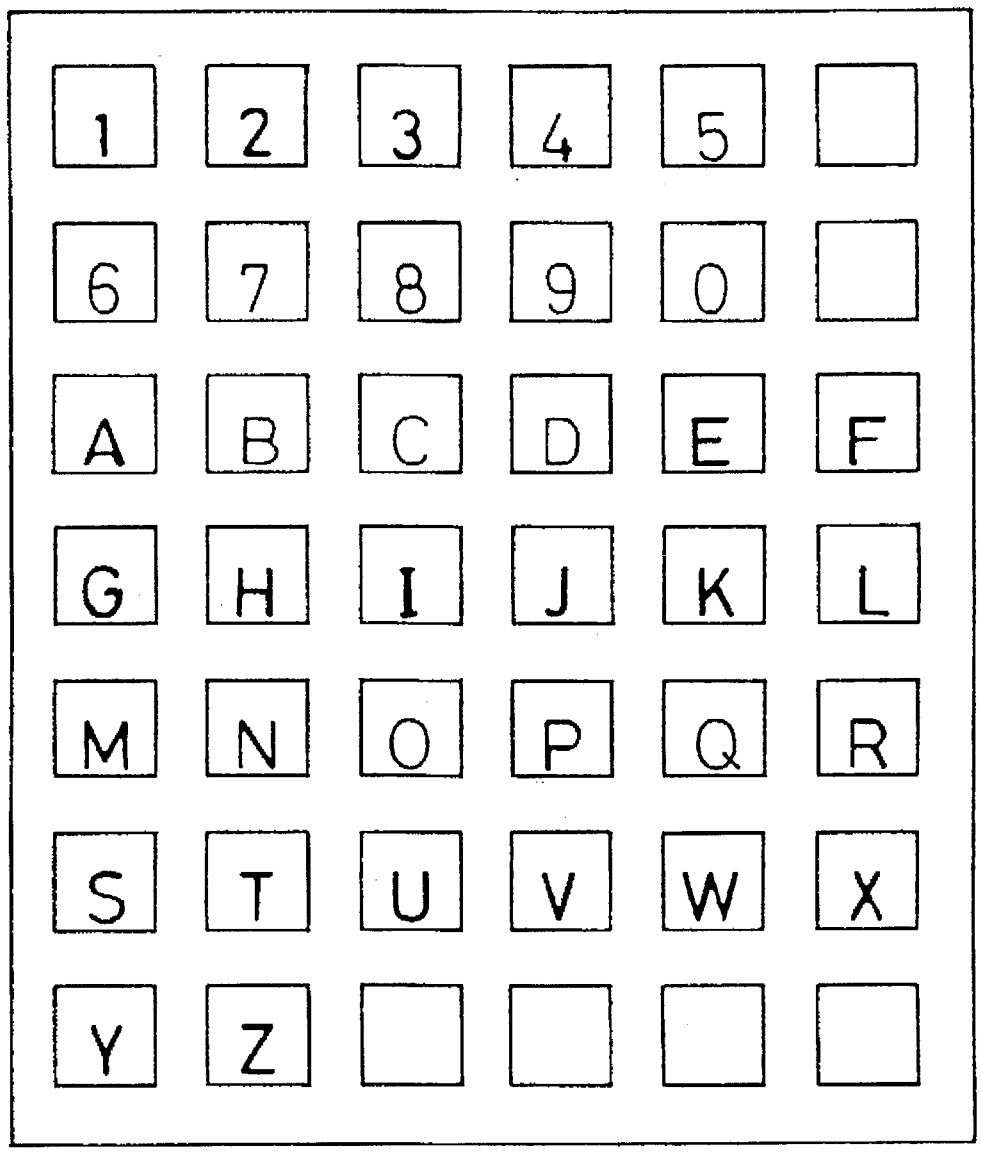
FIG. 5 is a diagram of a vertically elongated keyboard having keys arranged in an alphanumeric pattern.
Figure 7:
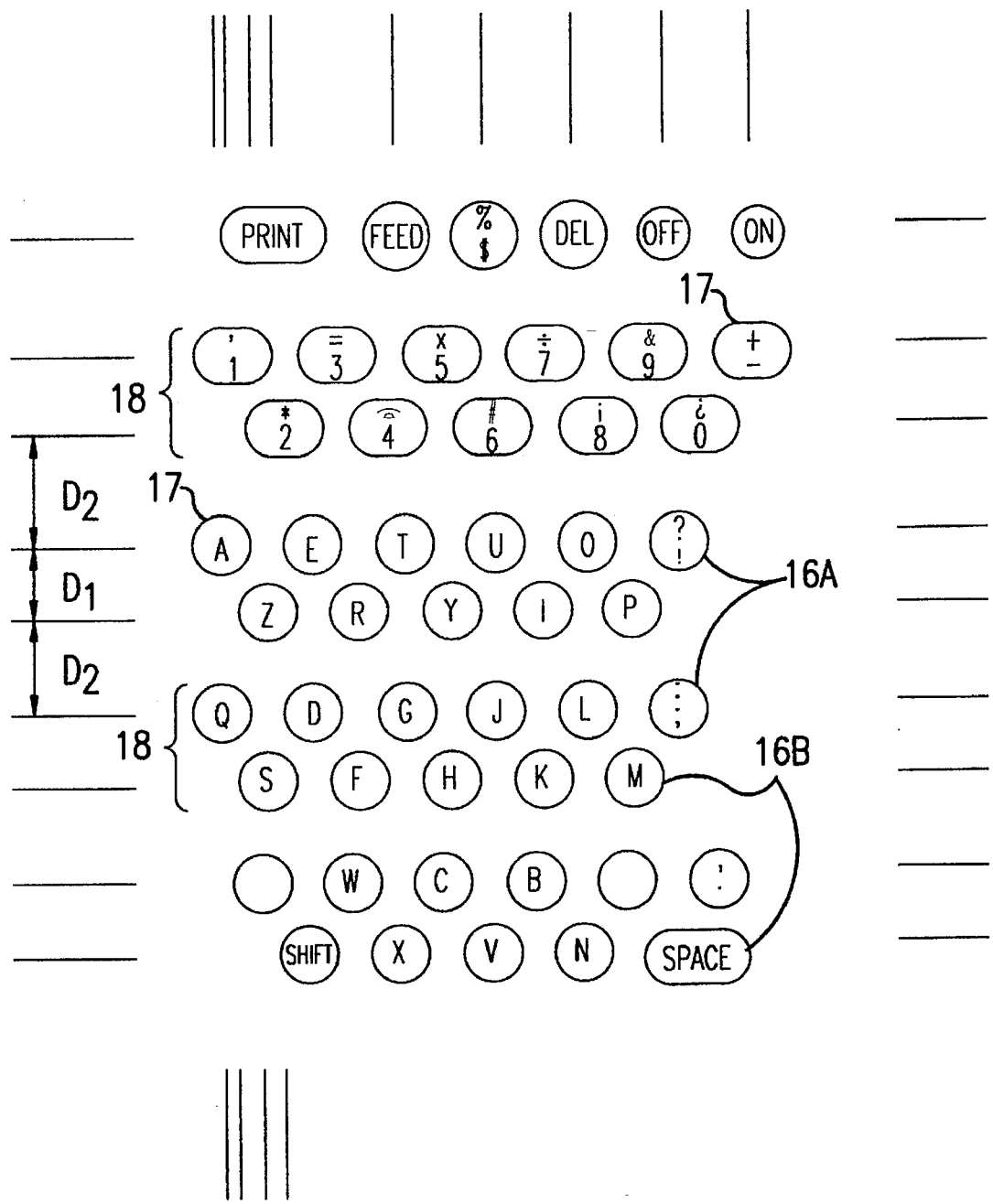
FIG. 7 is a diagram showing the key arrangement of another keyboard embodying the invention.
Figure 8:
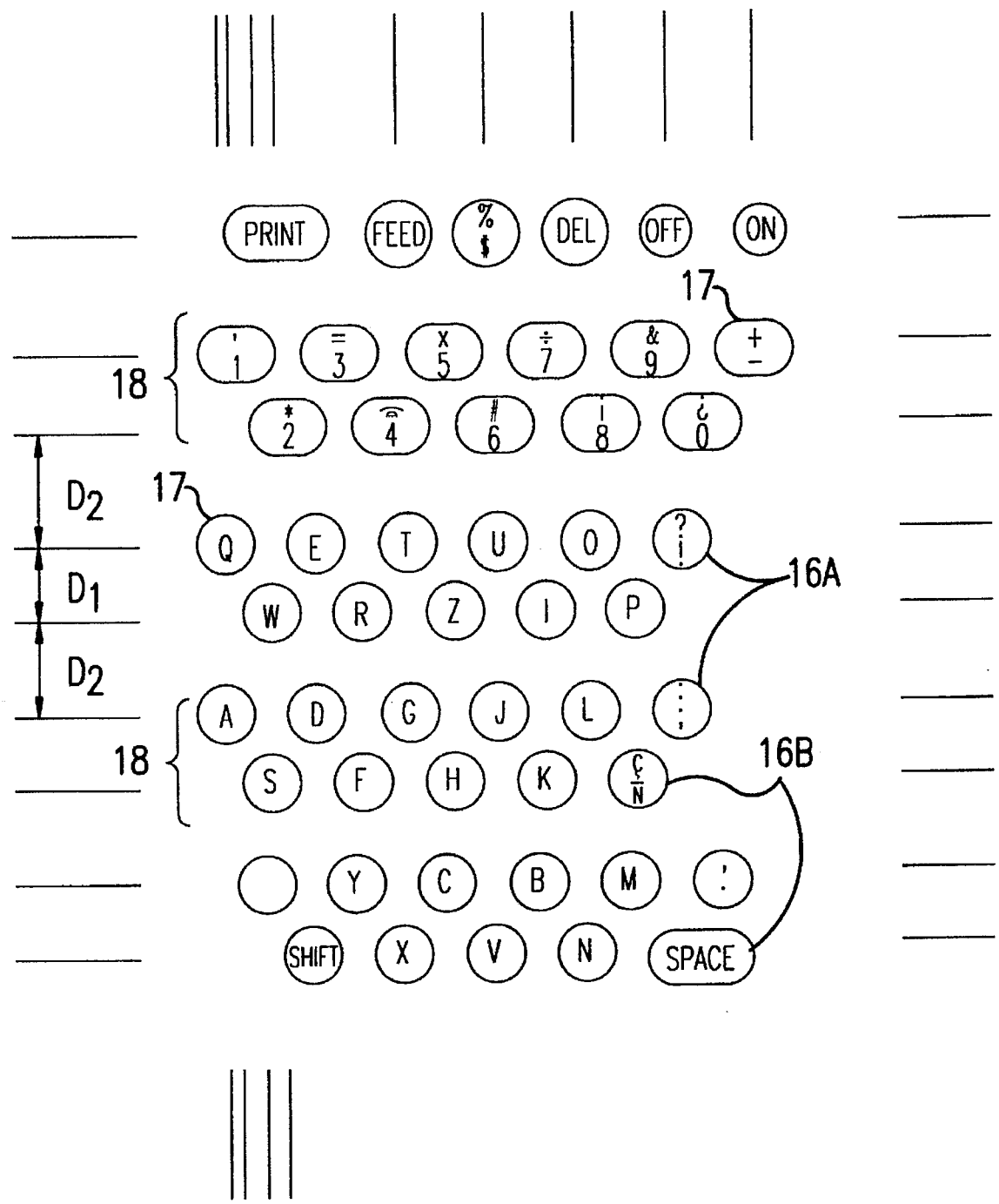
FIG. 8 is a diagram showing the key arrangement of yet another keyboard embodying the invention.

In European countries, the keys may be arranged differently than the keyboards shown in FIG. 2, FIG. 4 and FIG. 6. For instance, in France and Belgium, as shown in FIG. 7, the left end of the first level of the first set of letter keys is an "A", and the left end of the second level of the first set of letter keys is a "Z." In addition, the left end of the first level of the second set of letter keys is a "Q," and the right end of the second level of the second set of letter keys is an "M." Finally, the left end of the first level of the third set of letter keys is a W. In Germany, as shown in FIG. 8, the middle key of the second level of the first set of letter keys is a "Z", and the left end in the first level of the third set of letter keys is a "Y."

Regardless of the prevailing national standard, small vertically elongated keyboards that mimic a "full-sized" keyboard may be created using the interdigitated or staggered arrangements illustrated in FIG. 2 and FIG. 6.

Figure 9:
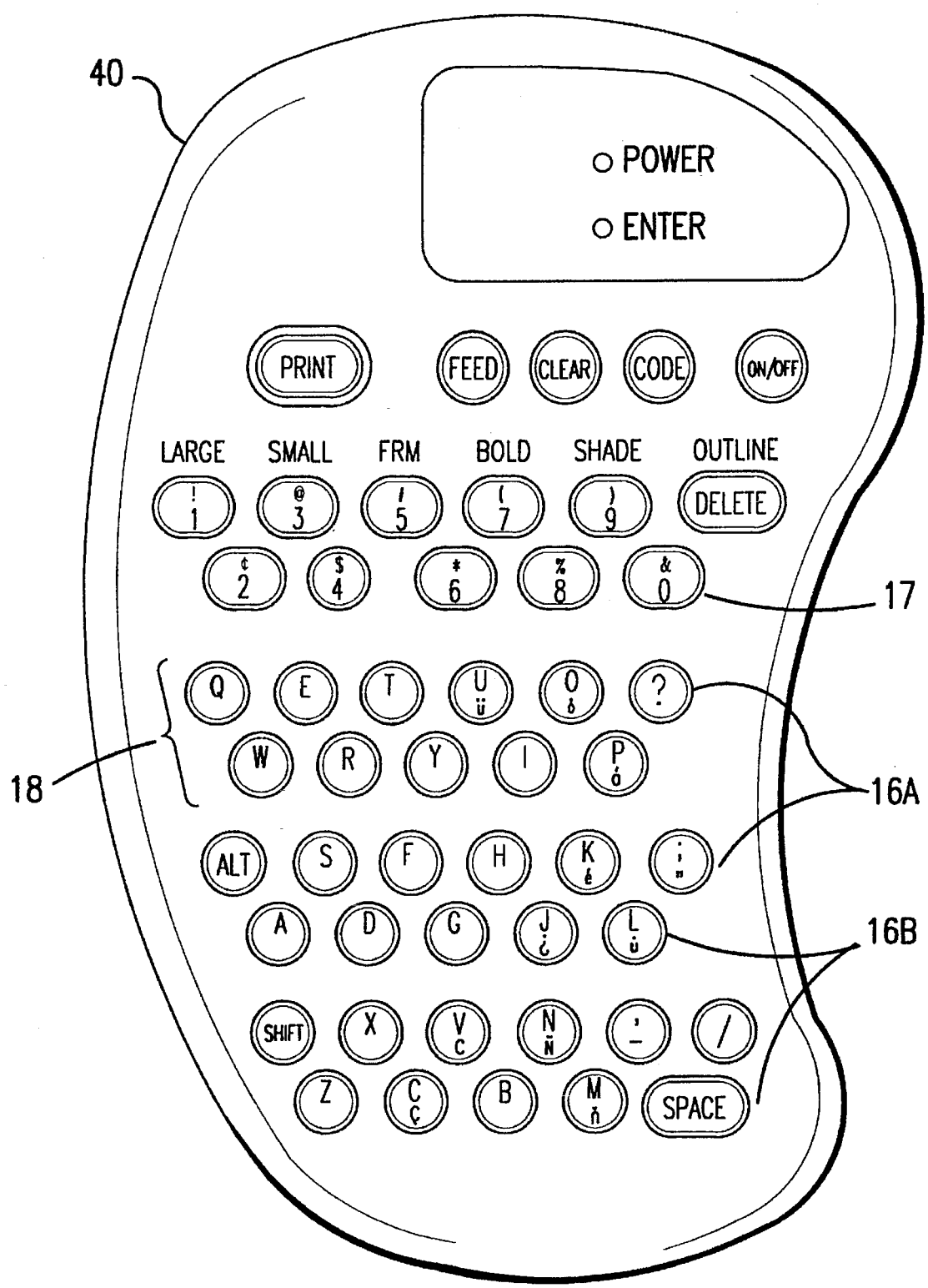
FIG. 9 is a diagram showing a portable electronic device capable of printing tape labels based on characters and symbols input via a keyboard embodying the invention.

FIG. 9 shows a portable electronic device 40 capable of printing characters and symbols on an elongated recording medium. The device 40 incorporates a keyboard embodying the invention having keys 17 that are arranged in sets 18, each set 18 comprising a first row 16A and a second row 16B of horizontally extending keys 17. A user of the device 40 enters characters or symbols using the keys 17, and the device 40 prints the entered characters or symbols on a recording medium.

The present invention is not limited to the embodiments described above and, as will be apparent to one of skill in the art, various changes may be made to the embodiments without departing from the scope and spirit of the invention. For example, while the top surfaces of the keys shown in FIG. 2 are shaped like the home plate of a baseball diamond, the keys could have any shape (such as diamond or a triangle), provided that the shape has a pointed portion.

Further, when a keyboard embodying the invention is used on a small horizontally elongated apparatus, the row of numeric keys (1, 2, 3, . . . ) and the first row of letter keys (Q, W, E, . . . ) of a standard full-sized keyboard, as shown in FIG. 4, may be combined into a single two level set, and the second row of letter keys (A, S, D, . . . ) and the third row of letter keys (Z, X, C . . . ) may be combined into a single two level set to shorten the vertical dimensions of the keyboard. In addition, although the invention has been described with reference to standard full-size keyboard arrangements of ASCII characters, the invention is equally applicable to other standard keyboard arrangements, such as a straight alphabetical (ABC) arrangement, or the Japanese alphabetical (A, I, U, E, O) arrangement.

As is apparent from the above description, a keyboard embodying the invention may have a large number of keys arranged in either the horizontal or vertical directions. Thus, regardless of whether the keyboard is horizontally elongated or vertically elongated, a key arrangement similar to a standard full-sized keyboard may be realized. Further, by arranging the keys of a vertically elongated keyboard such that their indicator portions are horizontally aligned, characters and symbols on the keys can be arranged in a straight line, thus making it easier for an operator to identify the keys.

What is claimed is:

1. A keyboard device for a compact electronic device, comprising a plurality of keys arranged in at least two sets, wherein each set of keys comprises a first horizontally extending row of keys and a second horizontally extending row of keys, wherein the keys of the first and second rows of each set are arranged in a staggered fashion, and wherein a vertical distance between the centers of adjacent keys in different rows of a set is smaller than a vertical distance between the centers of adjacent keys of different sets.

2. The device of claim 1, wherein a horizontal distance between the centers of adjacent keys within each row of a set is greater than a horizontal distance between the center of a key in the first row of the set and the center of an adjacent key in the second row of the set.

3. The device of claim 1, wherein the combined keys of the first and second rows of each set are arranged in the same sequence as a single row of keys of a standard keyboard.

4. The device of claim 1, wherein the keys of each row of each set are arranged in the same sequence as a single row of keys of a standard keyboard.

5. The device of claim 1, wherein top surfaces of the plurality of keys have a shape that includes a pointed indicator portion, and wherein the pointed indicator portions of the first and second rows of each set are arranged in an interdigitated manner.

6. The device of claim 5, wherein the combined keys of the first and second rows of each set are arranged in the same sequence as a single row of keys of a standard keyboard.

7. The device of claim 5, wherein the keys of each row of each set are arranged in the same sequence as a single row of keys of a standard keyboard.

8. The device of claim 5, wherein the pointed indicator portions of each of the plurality of keys bears a character or symbol that indicates the function of the key.

9. The device of claim 8, wherein the plurality of keys are arranged so that the characters or symbols on the pointed indicator portions of the keys of each set are aligned in a substantially straight line.

10. The device of claim 9, wherein the combined keys of the first and second rows of each set are arranged in the same sequence as a single row of keys of a standard keyboard.

11. The device of claim 9, wherein the keys of each row of each set are arranged in the same sequence as a single row of keys of a standard keyboard.

12. A portable electronic device, comprising:

a keyboard for inputting characters and symbols comprising a plurality of keys arranged in at least two sets, wherein each set of keys comprises a first horizontally extending row of keys and a second horizontally extending row of keys, wherein the keys of the first and second rows of each set are arranged in a staggered fashion and wherein the combined keys of the first and second rows of each set are arranged in the same sequence as a single row of keys of a standard keyboard; and a printer for printing characters and symbols input with the keyboard.

13. The device of claim 12, wherein a vertical distance between the centers of adjacent keys in different rows of a set is smaller than a vertical distance between the centers of adjacent keys of different sets.

14. The device of claim 12, wherein top surfaces of the plurality of keys have a shape that includes a pointed indicator portion, and wherein the pointed indicator portions of the first and second rows of each set are arranged in an interdigitated manner.

15. The device of claim 14, wherein the pointed indicator portions of each of the plurality of keys bears a character or symbol that indicates the function of the key.

16. The device of claim 15, wherein the plurality of keys are arranged so that the characters or symbols on the pointed indicator portions of the keys of each set are aligned in a substantially straight line.

17. A portable electronic device, comprising:

a keyboard for inputting characters and symbols comprising a plurality of keys arranged in at least two sets, wherein each set of keys comprises a first horizontally extending row of keys and a second horizontally extending row of keys, wherein the keys of the first and second rows of each set are arranged in a staggered fashion, and wherein a vertical distance between the centers of adjacent keys in different rows of a set is smaller than a vertical distance between the centers of adjacent keys of different sets; and a printer for printing characters and symbols input with the keyboard.

18. The device of claim 17, wherein top surfaces of the plurality of keys have a shape that includes a pointed indicator portion, and wherein the pointed indicator portions of the first and second rows of each set are arranged in an interdigitated manner.

19. The device of claim 18, wherein the pointed indicator portions of each of the plurality of keys bears a character or symbol that indicates the function of the key.

20. The device of claim 19, wherein the plurality of keys are arranged so that the characters or symbols on the pointed indicator portions of the keys of each set are aligned in a substantially straight line.

* * * * *